Nov. 2, 1971  B. O. WILLIAMS  3,616,556
MOVABLE DISPLAY
Filed Sept. 4, 1969  3 Sheets-Sheet 2
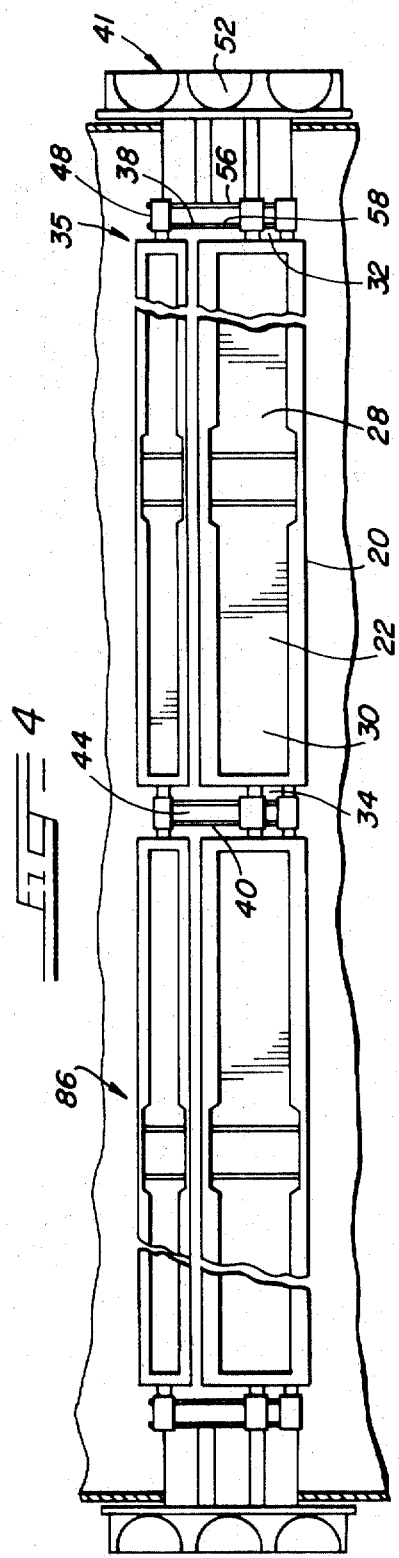
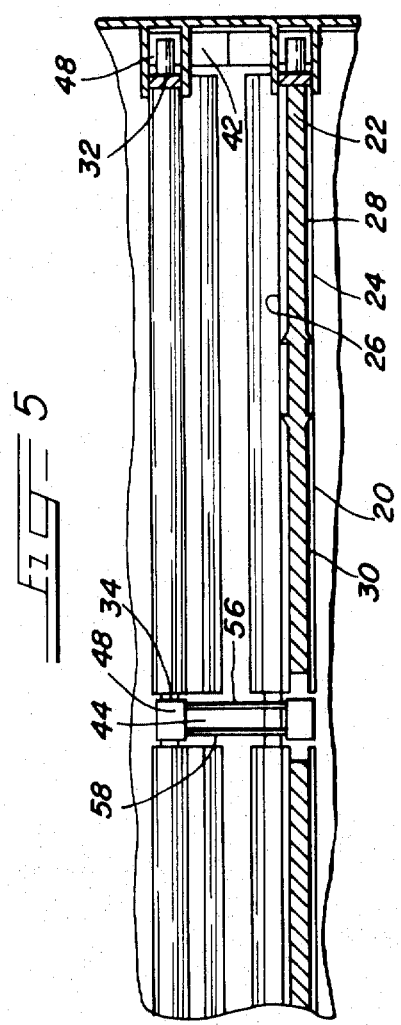
INVENTOR.
BERNHARD O. WILLIAMS
BY

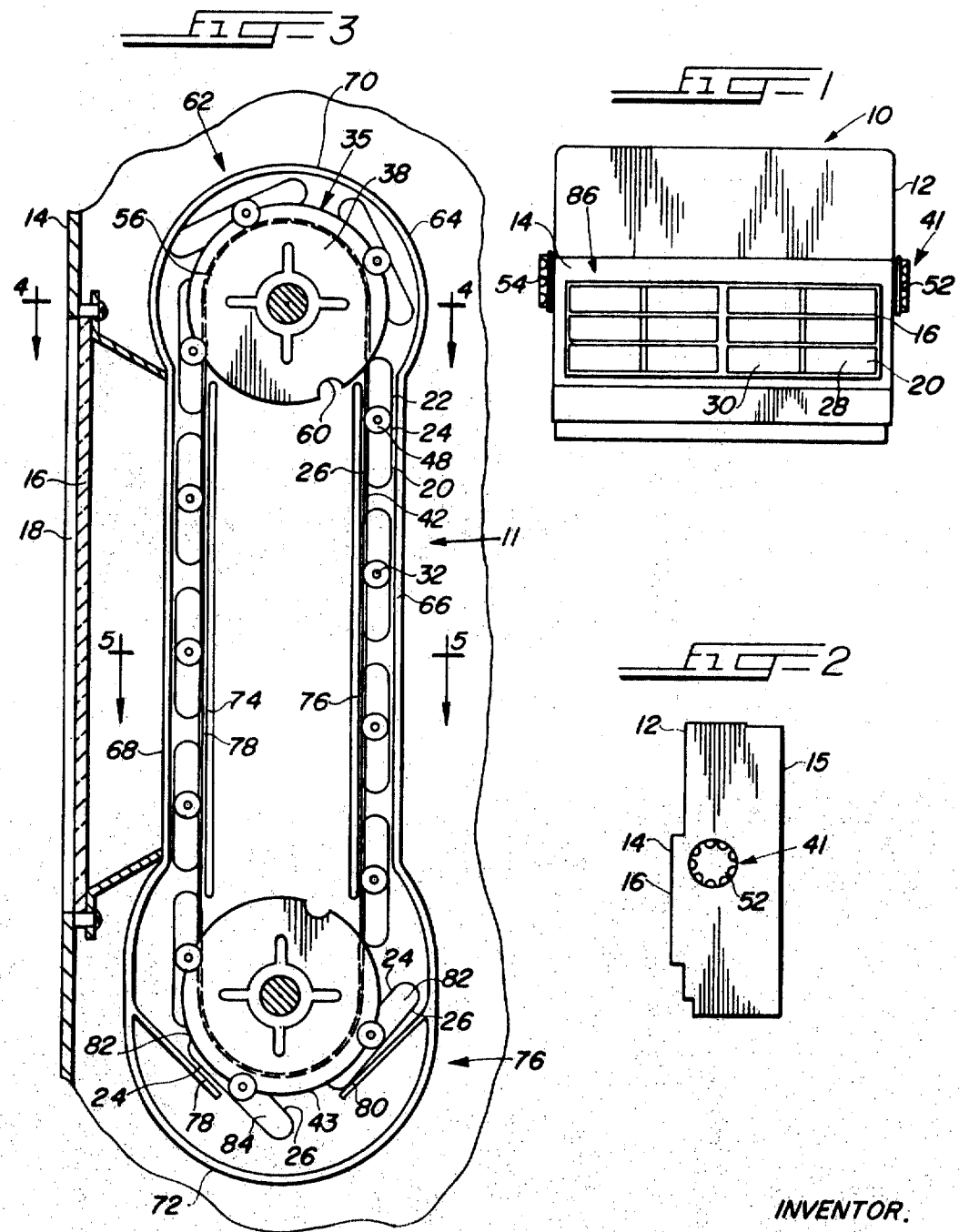

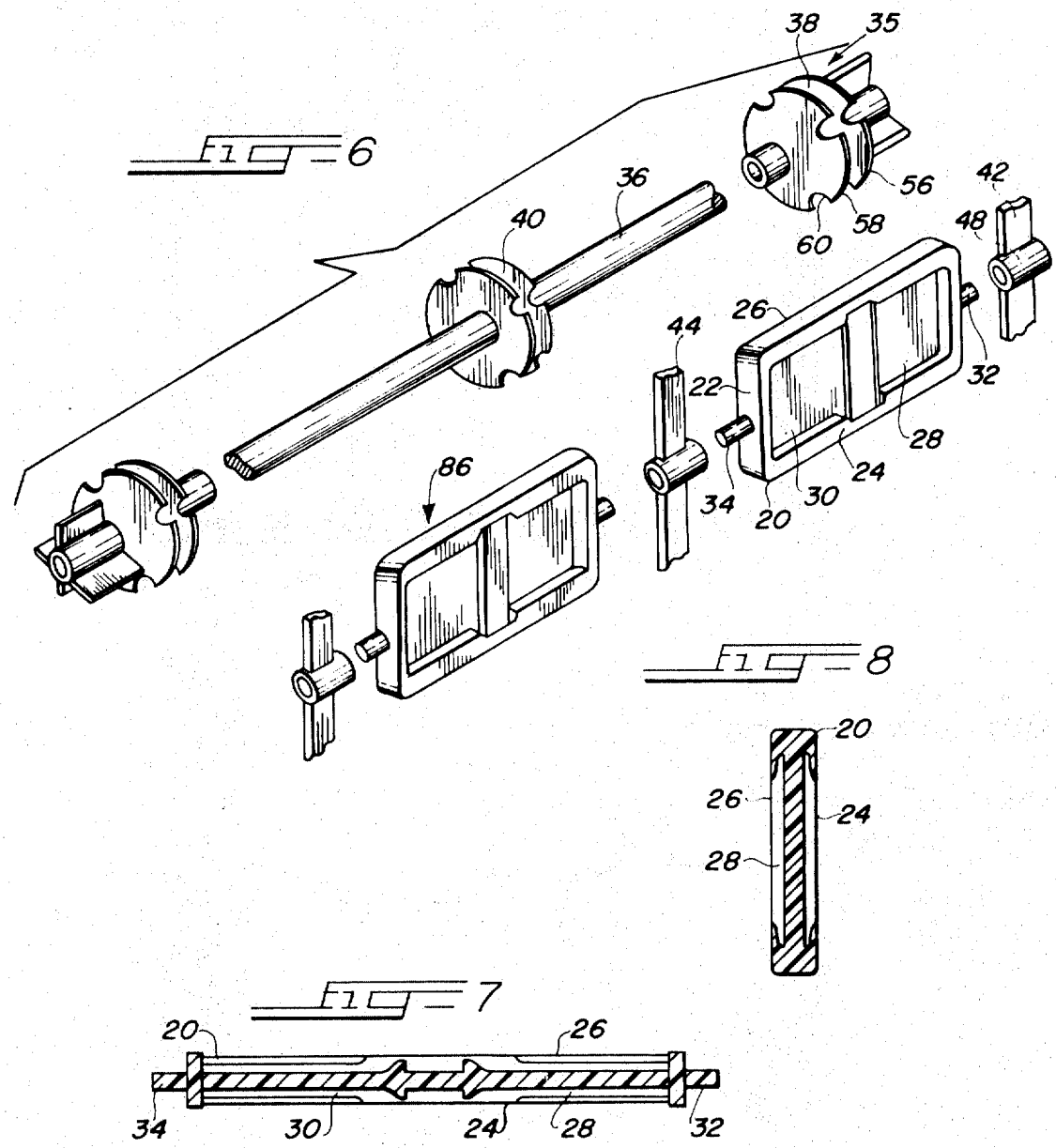

3,616,556
MOVABLE DISPLAY
Bernhard O. Williams, Elmhurst, Ill., assignor to
Walter E. Heller & Company, Chicago, Ill.
Filed Sept. 4, 1969, Ser. No. 855,244
Int. Cl. G09f 11/14
U.S. Cl. 40—97                                   6 Claims

ABSTRACT OF THE DISCLOSURE

A housing having a window in one vertical wall thereof encloses a series of rectangular display carriers which are pivotally mounted on endless belts. The belts are rotatable, in a track within the housing, about a horizontal axis and are adapted to carry the displays borne by the carriers past the window in sequential order. When the device is employed in a remote control phonograph wall box, each carrier bears a display of record titles on each of its opposing broad faces, and a pair of projecting fingers is positioned adjacent the track at one end of the housing to engage each carrier, in turn, as the belt is rotated, and to cause each carrier to flip over and exhibit its opposing face. On successive rotations of the belt, which is operated by a drive mechanism manually actuated by a customer, first one side of each of the carriers may be viewed through the window, in sequence, and then the opposing side of each carrier is exhibited at the window, also in sequential order.

BACKGROUND OF THE INVENTION

Field of the invention

The present invention relates generally to a device adapted to exhibit a maximum number of discrete exhibits, and more particularly, the subject invention is directed to a movable display device which is specifically designed for use in a remote control phonograph wall box to display, in sequence, the various titles available for selection by a prospective customer.

Description of the prior art

Devices which provide for the sequential display of separate informational exhibits are known in the art. Moreover, the prior art teaches the recognition of the fact that a space saving can be achieved by the utilization of an arrangement in which two-sided exhibits are employed, and in which first one side and then the other side thereof come into view. However, attempts to combine these two features (i.e., sequential and reversible displays) have involved the use of intricate mechanical arrangements, employing many moving parts, which occupy a great deal of space.

With particular reference to remote control phonograph wall box units, it is desirable to display a maximum number of record titles for customer selection, but it is also necessary that the device used for such display purposes take up minimum amount of space since such "wall boxes" are usually placed in close quarters such as restaurant booths, etc.

The most common form of display device presently employed in connection with phonograph wall boxes is the "swinging plate" arrangement wherein record title strips are maintained on both sides of a series of vertical plates which are commonly pivoted on a vertical axis. To view the available selections, a prospective customer swings the plates before a viewing window, one after the other. It can be seen that this type of arrangement does not lend itself to compactness, since to accommodate normal record title strips, which are approximately six inches long, the depth of the display device must exceed this length. Moreover, a minimum width of 12 inches is required for two plates to be displayed side by side and the glass area that must be provided to cover the viewing window in such an arrangement must be quite substantial and therefore is both expensive and readily susceptible to breakage through rough treatment of the wall box. Furthermore, in connection with a "swinging plate" wall box display, it is frequently difficult for a prospective customer to locate a particular title which he desires to select, for more than one display plate may be turned about the vertical axis at one time and, therefore, the ordered sequence of record titles may be broken.

Some improvement in the arrangement described above is represented by another prior art device in which a plurality of individual title-bearing carriers are mounted on a cylinder which may be rotated by a prospective customer to bring the carriers into view behind a window, in sequence. This arrangement, however, has the inherent disadvantage of requiring an apparatus having large dimensions in order to display as many selections as the "swinging plate" device. Moreover, it should be apparent in connection with this so-called improved design, that the backs of the individual display carriers are wasted, and that if the carriers were reversible so that both their opposing sides could be utilized for display purposes, the arrangement could exhibit as many titles as the "swinging plate" arrangement while occupying a much smaller space then wall box units heretofore known.

Some prior art phonograph wall boxes do employ reversible display carriers, but not in connection with an arrangement wherein the carriers are mounted on a rotating cylinder for sequential viewing. These "reversible" displays comprise an arrangement in which a first side of every display carrier is in view at one time, and a prospective customer can cause all of them to "flip" simultaneously to exhibit their second, or opposing, sides by actuating a lever mechanism provided to accomplish this function. It will readily appear that this arrangement, although embodying a "reversibility" feature, has several inherent disadvantages. First, it requires an extremely large window area, since all of the display carriers must be in view at one time. Second, the titles are not displayed sequentially, once again making it difficult for a prospective customer to locate a particular title he desires to select.

From the above, it can be seen that the phonograph wall box units of the proir art do not teach display arrangements in which a maximum utilization of the space available to display record titles is achieved in connection with sequential exhibiting which provides for ease in the selection of particular titles.

Apart from the art relating specifically to movable displays for phonograph wall box units, other prior art devices, designed to perform advertising functions, have employed rotatable and reversible display arrangements. However, because such devices are not intended for use in phonograph wall boxes, their design has not been directed toward the conservation of space, and consequently they are not adaptable for use in situations where this is an important consideration. Moreover, these movable advertising devices commonly employ intricate mechanical arrangements to achieve rotatability and reversibility, and such arrangements are not suitable for use in situations where they are to be operated by the public. That is, it must be expected that a phonograph wall box will be subjected to jarring, shaking, etc., on location, and the more moving parts employed in its display apparatus, the greater the likelihood of a breakdown in its operation. For this reason, the movable advertising displays of the prior art which employ such means as rollers or releasable latching members and counter weights to achieve rotatability and/or reversibility would not be suitable for use in a location such as a booth in a bar or restaurant. More importantly, these movable advertising display devices are rotatable only in a single direction. This represents a distinct disadvantage in connection with the use of such a device to display record titles in a phonograph wall box, since a prospective customer would have to rotate such a device through a complete cycle to return to a desired selection, once that selection was passed.

It is desirable that a movable display device for exhibiting record titles in a phonograph wall box offer a maximum number of possible selections in a minimum amount of space, display the record titles in an ordered sequence, and employ as few moving parts as possible. While a given movable display device of the prior art might embody one of these features, certainly none has all these features in combination.

SUMMARY OF THE INVENTION

In accordance with the present invention, a movable display device is provided which eliminates the inherent disadvantages encountered with regard to prior art display arrangements. The device of the subject invention will be described herein in its preferred embodiment in which it is adapted for use in displaying record titles in a remote control phonograph wall box, but other uses of this invention will readily appear to those skilled in the art.

In the movable display device of the present invention a housing adapted to be hung upon a wall is provided and has a viewing window, in its front vertical face, through which a prospective customer or operator can view the various record titles available for selection. The titles are borne by a plurality of rectangular display carriers, each of which is provided with slots to releasably carry two title strips, each bearing two record titles, on each of the opposing sides of the carrier. At both of the opposite longitudinal ends of the carrier a pivot member is integral therewith for mounting the carriers in a manner permitting them to be rotated, in sequence, past the viewing window and also to be "flipped" to display both their opposing sides, as will be explained hereinafter. In the preferred embodiment of the subject invention two movable displays in accordance with the subject invention, each comprising a row of display carriers as described above, are aligned side-by-side within the housing, but for convenience only one such display will be described.

Two horizontal shafts, each paralleling the front of the housing and mounted for rotation about its longitudinal axis within the housing, are provided in vertical alignment, the upper being a drive shaft and the lower an idler shaft. At each end of the former shaft drive pulleys are fixedly mounted thereupon for rotation therewith, and idler pulleys are connected to the ends of the idler shaft in a similar manner, each idler pulley being aligned directly beneath a drive pulley. A flexible, endless belt is trained around each drive pulley and the corresponding idler pulley beneath it, and the belts are adapted for rotation with these pulleys about their horizontal axis. Pivot mountings are molded onto each of the endless belts at fixed intervals about their lengths, and the mountings are adapted to releasably hold the pivot members on the display carrier. By means of this arrangement, each display carrier is suspended, by the pivot members at its opposite ends, between the endless belts. Thus, as the belts are rotated around the pulleys within the housing the suspended display carriers will be caused to rotate therewith and will pass, in sequence, before the window in the front vertical wall of the housing, either from top to bottom or bottom to top, depending on the direction in which the drive shaft is rotated by the operator of the device. In this connection it should be noted that the direction of rotation of the device is reversible.

It should be noted that the described rotatable pulley and belt arrangement can be replaced by other elements adapted to rotate a series of individual display carriers within the housing without departing from the scope of subject invention. For example, the display carriers could be pivotally mounted between rotatable discs positioned adjacent opposite sides of the housing, and other suitable arrangements will readily appear to those skilled in the art.

The movable belt and carrier arrangement described above is surrounded by a track designed to guide the rotational path of the belt and carrier combination within the interior of the housing, to align the carriers vertically for viewing through the window, and to cooperate with carrier displacing means (described hereinafter) to cause each carrier to automatically "flip" and exhibit its reverse side after each cycle of rotation.

The track comprises an outer race having front and back walls, positioned vertically between the drive and idler pulley arrangements, and laterally between the belts and the housing. These outer race walls cooperate with front and back vertical walls of an inner race, which also form a portion of the track, to maintain the display carriers in a vertical plane as they are rotated to ascend or descend between the drive and idler pulleys. Thus, by means of the actuation of a suitable drive mechanism (described hereinafter) to turn the drive shaft and the pulleys attached thereto, the display carriers are rotated about the track and pass, in vertical sequence, before the viewing window in the front of the housing.

In order to automatically flip the display carriers, in sequence, after they have made one circuit around the track so that the titles on their reversing sides will be exhibited on the next circuit, carrier displacing means are provided. The carrier displacing means are positioned on the interior of the outer track race, which is expanded about the region of the lower idler pulleys to cooperate with the means in this "automatic flipping" operation. As an individual display carrier is driven about the idler pulley a first finger of the displacing means engages the bottom of the carrier and causes it to pivotally rotate, about its pivot members (which are held in pivot mountings on the belts) out of its vertically aligned position to one in which its transverse axis makes an angle with both the horizontal and vertical planes. As the carrier is driven past the first projecting finger, a second projecting finger, in turn, engages the portion of the carrier below the horizontal plane and causes the carrier to "flip" so that its side formerly facing the inner track race, now faces the outer track race. As mentioned above, the portion of the outer track race adjacent to the displacing means is offset to cooperate with the projecting fingers to automatically "flip" the individual display carriers, and after the carriers are reversed they immediately enter between the vertical inner and outer race walls which maintain them in vertical alignment throughout the balance of the next circuit around the housing.

In accordance with the subject invention as described above, if two rows of thirteen display carriers each are aligned side by side within the housing, a total of 208 titles of available record selections can be exhibited in sequence, this total comprising the display of 104 titles on the first sides of each carrier, on a first complete rotation of the device, and 104 titles on their reverse sides on a second complete rotation. Furthermore the depth of such a movable display device in accordance with the present invention is only about two and one-half inches, which represents an extremely compact unit considering its large display capacity. It should be recognized that the movable display device of the present invention can be modified to provide for any number of display carriers, in a given row, and any number of rows, and that regardless of the number of carriers utilized a maximum number of titles can be displayed, in sequence, in a minimum amount of display space.

The drive mechanism employed in accordance with the present invention to operate the movable display comprises at least one drive handle fixedly connected to the drive shaft, and positioned on the exterior of the side wall of the housing. A prospective customer, by manually turning this drive handle in either a clockwise or counterclockwise direction, will cause the drive shaft and drive pulleys mounted thereupon to rotate in a corresponding direction. The drive pulleys are provided with integral notched plates on each side thereof which are adapted to drivingly engage the pivot mountings molded on the endless belts in such a manner that the rotation of the drive pulleys causes the belts, and carriers, to rotate in corresponding direction. As an alternative to providing for the manual turning of the drive wheel by a prospective customer, a motor and solenoid arrangement could be employed to electrically rotate the pulley, belt, and carrier arrangement in accordance with the subject invention.

Thus, as the drive wheel is turned, the display carriers will come into view (either at the bottom or top of the window in the housing, depending on whether the drive wheel is turned in a clockwise or counterclockwise direction) in sequence, and after passing the window, and continuing in their paths around the track, they are automatically "flipped" upon contacting the two projecting fingers positioned adjacent the idler pulley. On their subsequent pass before the display window, each display carrier will exhibit its opposite side to the prospective customer. A detent spring is employed in connection with the drive wheell to ensure proper alignment of display carriers before the viewing window.

By adjusting the area of the viewing window the number of display carriers in a given row that can be viewed at one time may be varied in accordance with the subject invention.

Thus, the movable display device of the present invention provides for a sequential exhibiting of a large number of record titles and occupies only a minimum amount of space due to the fact that both sides of the display carriers can be utilized for display purposes without destroying the sequence of the selection program. The automatic reversibility feature of the present invention is responsible for the large display capacity and for the space saving design of the movable display device.

Accordingly, a primary object of the present invention is to provide a movable display device which occupies a minimum amount of space and permits a maximum number of discrete informational exhibits to be displayed.

Another object of the present invention is to provide a movable display device in which a number of reversible display carriers are automatically "flipped" on successive rotations of the device so that twice as many displays can be exhibited as compared with a nonreversible arrangement.

Yet another object of the present invention is to provied a display device having very few moving parts and which will therefore not be subject to breakdown during its operation.

A further object of the present invention is to provide a movable display device in which the display carriers are reversible but in which the displays are exhibited in an ordered sequence which cannot be altered by operator of the device.

Yet a further object of the present invention is to provide a movable display in which individual display carriers are automatically reversed, in sequence, regardless of the direction in which the device is moved by the operator thereof.

These and other objects, advantages, and features of the present invention will hereinafter appear and, for purposes of illustration but not of limitation, an exemplary embodiment of the present invention is shown in the appended drawing.

DESCRIPTION OF THE DRAWING

FIG. 1 is a front view of a remote control phonograph wall box unit which comprises the movable display device of the subject invention.

FIG. 2 is a right side view of the phonograph wall box unit shown in FIG. 1.

FIG. 3 is a full size, cut-away, right side view of a movable display device in accordance with the subject invention.

FIG. 4 is an enlarged cross-sectional view taken along line 4—4 in FIG. 3.

FIG. 5 is a cross-sectional view taken along line 5—5 in FIG. 3.

FIG. 6 is an exploded perspective view of the pulley, display carrier, an endless belt arrangement utilized in the movable display device illustrated in FIG. 3.

FIG. 7 is a cross-sectional plan view of a display carrier in accordance with the present invention.

FIG. 8 is a cross-sectional right side view of the display carrier illustrated in FIG. 7.

DETAILED DESCRIPTION OF THE PREFERRED EMBODIMENT

With reference to FIG. 1 of the drawing, a phonograph wall box unit 10 embodying the movable display device 11 of the present invention is illustrated. Unit 10 comprises a housing 12 having a vertical front wall 14 and a vertical back wall 15 from which the unit is adapted to be hung in a suitable location. A vertical window 16 is formed in wall 14 to provide a view into the interior of housing 12. Window 16 may be covered by a flat transparent pane 18 of glass or a suitable plastic.

Within the interior of housing 12, a plurality of display carriers 20 are movably maintained in a manner (hereinafter described) which permits the operator of the wall box unit to rotate them, in sequence, past window 16 for viewing. As best seen in FIGS. 6–8, each display carrier 20 comprises a rectangular body portion 22 having broad first and second sides 24 and 26, each of which is divided transversely into slots 28 and 30 adapted to releasably carry strips bearing the titles of records which are available for selection by a prospective customer. At the opposite longitudinal ends of each display carrier 20 pivot members 32 and 34 are integral with carrier body 22, and by means of pivot members 32 and 34, each display carrier 20 is pivotally mounted for rotation about its horizontal, longitudinal axis in such a manner that either of its opposing sides 24 or 26 may be positioned for viewing by a prospective customer through window 16.

Rotatable means 35 are positioned within housing 12 and are adapted to transport display carriers 20 around the housing to bring them into view, in sequence, at window 16. Rotatable means 35, in the preferred embodiment of the subject invention, comprise a horizontal drive shaft 36 (FIG. 6) which extends across the entire width of the housing 12 and is adapted for pivotal rotation, about its horizontal axis, with respect to housing 12. Connected to drive shaft 36 are drive pulleys 38 and 40 which are spaced from one another, along shaft 36, a distance in excess of the length of display carriers 20. (In accordance with the preferred embodiment of the subject invention, as illustrated in FIG. 6, two rows of display carriers are utilized side by side, but for convenience only one such row will be described.) Drive pulleys 38 and 40 are adapted to cause display carriers 20 to rotate around the interior of housing 12, so as to pass window 16, when an actuating force is applied to drive shaft 36 by suitable drive means 41.

Adjacent the bottom of housing 12 rotatable means 35 further comprise a horizontal idler shaft (not shown) which extends across the entire width of housing 12, and lies in the same vertical plane as drive shaft 36. The idler shaft is also adapted for rotation about its horizontal axis, and has two idler pulleys 43 fixedly mounted thereupon, for rotation therewith and positioned directly beneath drive pulleys 38 and 40 respectively.

Rotatable means 35 further comprise two endless belts 42 and 44 preferably made of a strong flexible material such as polypropylene. Belt 42 is trained over drive pulley 38 adjacent the top of housing 12, and is in driving engagement therewith and is also trained around the idler pulley 43 vertically aligned beneath drive pulley 38. Similarly, belt 44 is trained over drive pulley 40 and its corresponding idler pulley 43, and is maintained in driving engagement with both pulleys. At intervals along each of the endless belts 42 and 44 pivot mountings 48 are molded integral therewith and are adapted to receive pivot members 32 and 34 at the opposite ends of display carriers 20. In accordance with this arrangement, display carriers 20 are suspended from their ends between endless belts 42 and 44, at intervals around these belts, and carriers 20 are adapted to travel around the interior of housing 12 in an approximately circular path when belts 42 and 44 are driven by the respective drive pulleys 38 and 40.

Furthermore, the carriers 20 are pivotally mounted on belts 42 and 44 for rotation about their longitudinal axis, relative to the belts, and are adapted to be automatically flipped (in a manner hereinafter described) so as to display each of their opposite faces 24 and 26 at window 16 on alternate circuits of rotatable means 35 about housing 12.

Actuation of drive shaft 36 to cause rotation of rotatable means 35 is accomplished by the manual turning of drive wheels 52 and 54 which are connected to drive shaft 36 and are mounted on the exterior of the housing 12, on opposite sides thereof. The operator of the movable display device 11 of the present invention can turn these drive wheels in either direction and thereby cause display carriers 20 to pass in sequence before the window 16, either from bottom to top or top to bottom, depending on whether drive wheels 52 and 54 are rotated in a clockwise or counterclockwise direction. Alternatively, an electric motor and solenoid switch arrangement can be employed in accordance with the present invention to drive rotatable means 35 electrically.

Regardless of the means utilized to rotate drive shaft 36, belts 44 and 46 are, in turn, driven by the shaft in the following manner. Adjacent each side of belts 42 and 44 drive pulleys 38 and 40 are provided with drive plates 56 and 58. Drive plates 56 and 58 have notches 60 spaced around their periphery, adapted to drivingly engage pivot mountings 48 molded on flexible belts 42 and 44. Thus, when the operator of phonograph unit wall box 10 desires to view the available title selections, he turns one drive wheel 52 or 54, in either a counterclockwise or clockwise direction. This, in turn, causes drive shaft 36, drive pulleys 38 and 40, and drive plates 56 and 58 to rotate in a corresponding direction. Upon rotation of drive plates 56 and 58, notches 60 drivingly engage the pivot mountings 48 on flexible belts 42 and 44, causing the belts to rotate in the same direction as drive wheels 52 and 54, whereby display carriers 20 will pass, in sequence, before window 16. Idler pulleys 43 are also provided with notched places which are drivingly engaged by pivot mountings 48 on belts 42 and 44, and are adapted to keep the belts taut during operation of movable display device 11.

It should be noted that other elements can be used to form rotatable means 35 in accordance with the present invention. For example, display carriers 20 can be pivotally mounted upon, and suspended between, two discs which can be rotated within housing 12 by suitable driving means, within the scope of the subject invention. In addition, other arrangements of suitable rotatable means 35 will readily occur to those skilled in the art.

In order to ensure proper alignment of display carriers 20 as they are transported within housing 12, and to cooperate in the "flipping" of carriers 20, a track 62 is provided within housing 12. Track 62 comprises an outer race 64 which has vertical walls 66 and 68 generally paralleling the vertical portion of the belts 42 and 44 located between drive pulleys 38 and 40 and the corresponding idler pulleys 43. At the opposite ends of vertical walls 66 and 68, outer race 64 is expanded to form generally hemispherically shaped portions 70 and 72, adapted to guide display carriers 20 in their rotation about, and between, the drive pulleys and idler pulley. Also, disposed vertically between the drive pulleys and corresponding idler pulleys is an inner race 74 which comprises two vertical walls 76 and 78 paralleling vertical walls 66 and 68 of outer race 64, but spaced therefrom in a direction toward the interior of the housing 12 at a distance slightly in excess of the transverse depth display carriers 20. Thus, track 62 ensures that display carriers 20 remain properly positioned during their travel and that they are vertically aligned when they pass before the window 16.

As mentioned above both the opposite sides 24 and 26 of each display carrier 20 are adapted to bear record title strips and, in accordance with the subject invention, only one side of each display carrier 20 is in view through the window 16 when a particular carrier is rotated past the window. However, by means of display carrier displacing means 76 acting in cooperation with track means 62, carriers 20 of movable display device 11 are adapted to be automatically "flipped" as they pass displacing means 76, so that on their next pass before window 16, the side opposite to that to which was previously viewable therethrough is exhibited to a prospective customer.

Carrier displacing means 76 comprise two fingers 78 and 80 which extend generally inwardly and downwardly from the interior wall of hemispherically shaped portion 72 of outer race 64, adjacent the bottom idler pulley. Projecting fingers 78 and 80 are positioned so as to engage the display carriers as they are carried around the idler pulley and to rotate them through 180° about their longitudinal pivot axis on the flexible belts 44 and 46. As shown in FIG. 3, which represents a situation in which the drive wheel 52 is rotated in a counterclockwise direction, a display carrier 82, which has just exhibited its side 24 at window 16, is contacted by projecting finger 78 and caused to rotate about its longitudinal axis through an acute angle, in a counterclockwise direction. As belts 42 and 44 carry display carrier 82 past the first projecting finger 78, the portion of the carrier 84, which lies below the horizontal axis of the carrier 82, is subsequently contacted by second projecting finger 80. Further movement of the carrier 82 about the idler pulley, while its lower portion 84 is in contact with finger 80, causes it to "flip" in a clockwise direction, and assume a position wherein its side 26 will be facing the exterior housing 12 and therefore will be exhibited to the prospective customer on the next pass of display carriers 82 before window 16. This automatic "flipping" operation is performed on each carrier 20, as it passes displacing means 76, and in this manner the program is kept in sequence.

Thus, it can be seen that in the movable display device 11 of the present invention individual display carriers 20 are rotated vertically, in sequence, before the display window 16, in either direction. Furthermore, after passing window 16 each carrier 20 is automatically "flipped" so that it will display its opposite side on its next pass before window 16. Therefore subject invention provides for the exhibit of twice as many record titles as would be accomplished by means of single-sided, nonreversible, carriers.

Although the above description relates to only a single row of display carriers 20, as will be seen in FIG. 1, and 4-6, the preferred embodiment of the subject invention utilizes a second row of display carriers 86 positioned beside the first and arranged in a manner identical to the first row, as described above. In addition, in the preferred embodiment shown in FIG. 1 the area of window 16 is sufficient to permit three display carriers in each of the two rows (or a total of six) to be viewed simultaneously. It can be seen that by varying the window area, the number of carriers displayed concurrently can be changed. Since each carrier 20 has two slots 28 and 30, on both its opposite faces, 24 and 26, and since each slot is adapted to carry a title strip bearing two available record selections, a total of 24 titles are in view at one time in the preferred embodiment shown in FIG. 1, and eight additional selections are brought into view each time the movable device 11 is rotated to exhibit an additional display carrier 20 in each of the two rows. To ensure proper alignment of the display carriers before the window 16, a detent spring (not shown) is positioned adjacent the point of attachment of drive wheels 52 and 54 to drive shaft 36, to releasably lock rotatable means 35 in the position shown in FIG. 1.

In accordance with the present invention as described above (shown full size in FIG. 3), the front to back dimension of the movable display device 11 is only approximately 2½ inches and it is therefore only about one-half as deep as prior art devices having equivalent display capacities. Furthermore, the preferred embodiment of the present invention is adapted to exhibit 208 record titles, which is at least equal to the number exhibited by the larger prior art devices.

It should be further understood that various changes, modifications and alterations may be made in the arrangements of the elements of the described embodiment of the present invention without departing from the spirit and scope thereof as defined in the appended claims.

What is claimed is:

1. A movable display device comprising:
   a housing having a window through which a display can be viewed;
   a plurality of reversible display carriers having displays on each of the opposite sides thereof adapted to be viewed through said window;
   reversible rotatable means mounted within said housing and adapted to rotate said carriers about said housing in either a first or second direction to pass before said window, said carriers being pivotally mounted on said rotatable means so that either side of said carriers can be viewed through said window;
   drive means adapted to be manually actuated to rotate said rotatable means in either a first or second direction; and
   a track adapted to guide said carriers in their rotation about said housing, having an inner race and an outer race spaced therefrom, said outer race having a portion thereof removed and being adapted to cause said carriers to flip over, in sequence, when they reach said removed portion, so that the sides of said carriers exhibited at said window on the previous pass of said carriers therebefore will be rotated out of view and the opposite rides of each of said carriers will come into view on the succeeding pass, regardless of the direction in which said rotatable means are driven by said drive means.

2. A movable display device as claimed in claim 1 wherein said outer race comprises two generally straight segments parallely positioned between said carriers and said housing adjacent the front and back of said housing, respectively, said straight segments being connected by generally hemispherical segments adjacent the top and bottom of said housing, and wherein a portion of one of said hemispherical segment is removed generally along a cord of the hemisphere so that the edges of the outer race formed by the removal of an arc of the hemisphere are adapted to cause each of said display carriers, in turn, to flip relative to said rotatable means.

3. A display device as claimed in claim 2 wherein:
   a first edge of the hemispherical section of the outer race formed by the removal of an arc of the hemisphere is adapted to contact each of said display carriers, in sequence, and to cause each of said display carriers to pivotally rotate relative to said rotatable means; and
   a second edge of the hemispherical section of the outer race formed by the removal of an arc of the hemisphere is adapted to contact each of said display carriers, in sequence, after they are released by said first edge to cause them to flip over,
   whereby the side of each display carrier opposite to that which was exhibited at said window on the previous pass of each carrier therebefore will be displayed on the next subsequent pass, regardless of the direction in which said rotatable means are rotated.

4. A movable display device as claimed in claim 2 wherein said rotatable means comprises:
   first and second pulleys mounted for pivotal rotation within said housing; and
   an endless belt trained about said first and second pulleys and adapted for rotation therewith.

5. A display device as claimed in claim 4 wherein:
   said endless belt comprises a plurality of pivot mountings connected about its perimeter, said mountings being adapted to receive pivot members at the opposite ends of said display carriers; and
   said first and second pulleys have notches adapted to releasably grip said pivot mountings to drive said belt and said display carriers around said track.

6. A movable device display as claimed in claim 5, wherein:
   said display carriers comprise rectangular segments adapted to carry at least one information bearing strip on each of its opposing broad surfaces; and
   said pivot members are connected at opposite ends of each of said rectangular segments and extend along the longitudinal axis of said carriers.

References Cited

UNITED STATES PATENTS

| | | | |
|---|---|---|---|
| 1,755,753 | 4/1930 | Voss | 40—97 |
| 2,181,104 | 11/1939 | Moorhouse | 40—97 |
| 2,200,533 | 5/1940 | Borregard | 40—32 |

ROBERT W. MICHELL, Primary Examiner

L. R. OREMLAND, Assistant Examiner